US012598035B2

(12) United States Patent
Zhang et al.

(10) Patent No.: US 12,598,035 B2
(45) Date of Patent: Apr. 7, 2026

(54) SYSTEMS AND METHODS FOR BEAM INDICATION FOR L1/L2 CENTRIC INTER-CELL MOBILITY

(71) Applicant: Apple Inc., Cupertino, CA (US)

(72) Inventors: Yushu Zhang, Beijing (CN); Chunhai Yao, Beijing (CN); Chunxuan Ye, San Diego, CA (US); Dawei Zhang, Saratoga, CA (US); Haitong Sun, Cupertino, CA (US); Hong He, San Jose, CA (US); Huaning Niu, San Jose, CA (US); Oghenekome Oteri, San Diego, CA (US); Wei Zeng, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 678 days.

(21) Appl. No.: 17/796,855

(22) PCT Filed: Aug. 4, 2021

(86) PCT No.: PCT/CN2021/110418
§ 371 (c)(1),
(2) Date: Feb. 9, 2023

(87) PCT Pub. No.: WO2023/010300
PCT Pub. Date: Feb. 9, 2023

(65) Prior Publication Data
US 2023/0370218 A1 Nov. 16, 2023

(51) Int. Cl.
*H04L 5/00* (2006.01)

(52) U.S. Cl.
CPC .......... *H04L 5/0035* (2013.01); *H04L 5/0091* (2013.01)

(58) Field of Classification Search
CPC ..................................................... H04L 5/0035
See application file for complete search history.

(56) References Cited

U.S. PATENT DOCUMENTS

| | | | |
|---|---|---|---|
| 2019/0039059 A1 | 2/2019 | Wilson et al. | |
| 2019/0260524 A1 | 8/2019 | Nam et al. | |
| (Continued) | | | |

FOREIGN PATENT DOCUMENTS

| | | | |
|---|---|---|---|
| CN | 112702155 | 4/2012 | |
| CN | 110474751 | 11/2019 | |
| (Continued) | | | |

OTHER PUBLICATIONS

International Search Report and Written Opinion dated Apr. 26, 2022, PCT/CN2021/110418, 9 pages.

(Continued)

*Primary Examiner* — Fahmida S Chowdhury
(74) *Attorney, Agent, or Firm* — Brownstein Hyatt Farber Schreck, LLP

(57) ABSTRACT

Systems and methods for beam indication for layer 1/layer 2 (L1/L2) centric inter-cell mobility are described herein. A base station may provide a user equipment (UE) with beam indications, in one or more transmission configuration indication (TCI) states, and may provide different beam indications for different search spaces (SSs), including UE-specific search space (USS) and common search space (CSS) within a same control channel resource set (CORESET). A UE may implicitly select a radio link monitoring (RLM) and beam failure detection (BFD) reference signal (RS) in accord with one or more methods, and in some cases may implicitly select an RLM/BFD RS based on one or more received TCI states or beam indications.

15 Claims, 8 Drawing Sheets

(56) References Cited

U.S. PATENT DOCUMENTS

| | | | |
|---|---|---|---|
| 2019/0342907 A1* | 11/2019 | Huang | H04W 72/23 |
| 2020/0045709 A1* | 2/2020 | Seo | H04W 72/53 |
| 2020/0084739 A1* | 3/2020 | Si | H04L 5/0048 |
| 2020/0145982 A1* | 5/2020 | Cheng | H04L 5/0053 |
| 2020/0154489 A1* | 5/2020 | Zhou | H04L 5/0048 |
| 2020/0245333 A1* | 7/2020 | Lin | H04L 5/0094 |
| 2020/0275483 A1* | 8/2020 | Li | H04L 27/0006 |
| 2020/0280409 A1* | 9/2020 | Grant | H04L 5/0044 |
| 2020/0351055 A1* | 11/2020 | Manolakos | H04B 7/088 |
| 2021/0037562 A1* | 2/2021 | Takeda | H04L 12/189 |
| 2021/0058906 A1* | 2/2021 | Seo | H04B 7/0617 |
| 2021/0136773 A1 | 5/2021 | Yang et al. | |
| 2021/0227613 A1* | 7/2021 | Zhang | H04W 72/542 |
| 2021/0242922 A1 | 8/2021 | Koskela et al. | |
| 2021/0314927 A1* | 10/2021 | Noh | H04L 5/0053 |
| 2022/0149919 A1* | 5/2022 | Takahashi | H04W 76/19 |
| 2022/0174714 A1* | 6/2022 | Venugopal | H04B 7/0639 |
| 2022/0287071 A1* | 9/2022 | Seo | H04L 5/0094 |
| 2022/0295315 A1* | 9/2022 | Takahashi | H04W 24/04 |
| 2022/0295405 A1* | 9/2022 | Seo | H04W 52/0235 |
| 2023/0147604 A1* | 5/2023 | Li | H04L 5/001 370/329 |
| 2023/0370218 A1* | 11/2023 | Zhang | H04L 5/0091 |
| 2023/0396301 A1* | 12/2023 | Yuan | H04B 7/0417 |
| 2024/0080809 A1* | 3/2024 | Matsumura | H04W 72/23 |
| 2024/0306053 A1* | 9/2024 | Matsumura | H04W 36/0072 |

FOREIGN PATENT DOCUMENTS

| | | |
|---|---|---|
| CN | 110719139 | 1/2020 |
| CN | 111713049 | 9/2020 |
| CN | 112088500 | 12/2020 |
| CN | 112088545 | 12/2020 |

OTHER PUBLICATIONS

Samsung, "Moderator summary for multi-beam enhancement," 3GPP TSG RAN WG1 #107-e R1-2111715, Nov. 19, 2021, 46 pages.

Vivo, "Further discussion on enhancement of MTRP operation," 3GPP TSG RAN WG1 #103-e R1-2007645, Nov. 13, 2021, 15 pages.

* cited by examiner

100

104

106

102

110

Cell 1

Cell 2

108

200

204

206

208

210

202

Cell 1

Cell 2

300

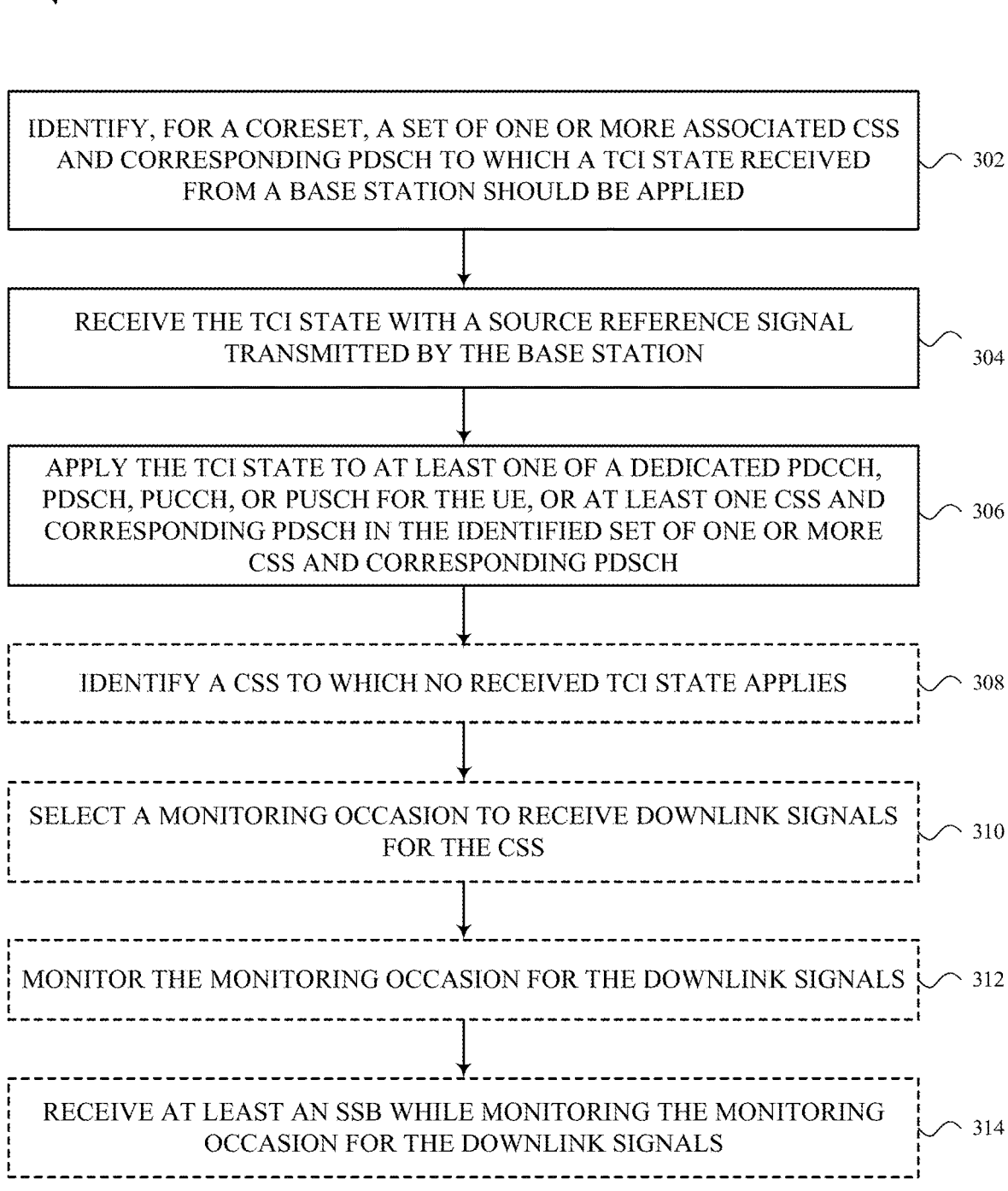

IDENTIFY, FOR A CORESET, A SET OF ONE OR MORE ASSOCIATED CSS AND CORRESPONDING PDSCH TO WHICH A TCI STATE RECEIVED FROM A BASE STATION SHOULD BE APPLIED ⟩ 302

RECEIVE THE TCI STATE WITH A SOURCE REFERENCE SIGNAL TRANSMITTED BY THE BASE STATION ⟩ 304

APPLY THE TCI STATE TO AT LEAST ONE OF A DEDICATED PDCCH, PDSCH, PUCCH, OR PUSCH FOR THE UE, OR AT LEAST ONE CSS AND CORRESPONDING PDSCH IN THE IDENTIFIED SET OF ONE OR MORE CSS AND CORRESPONDING PDSCH ⟩ 306

IDENTIFY A CSS TO WHICH NO RECEIVED TCI STATE APPLIES ⟩ 308

SELECT A MONITORING OCCASION TO RECEIVE DOWNLINK SIGNALS FOR THE CSS ⟩ 310

MONITOR THE MONITORING OCCASION FOR THE DOWNLINK SIGNALS ⟩ 312

RECEIVE AT LEAST AN SSB WHILE MONITORING THE MONITORING OCCASION FOR THE DOWNLINK SIGNALS ⟩ 314

TRANSMIT TO A UE, FOR A CORESET, AN INDICATION OF AT LEAST ONE CSS IN A SET OF ONE OR MORE ASSOCIATED CSS AND CORRESPONDING PDSCH TO WHICH A TCI STATE TRANSMITTED BY THE BASE STATION SHOULD BE APPLIED

402

TRANSMIT THE TCI STATE TO THE UE, ALONG WITH AN ASSOCIATED SOURCE REFERENCE SIGNAL

404

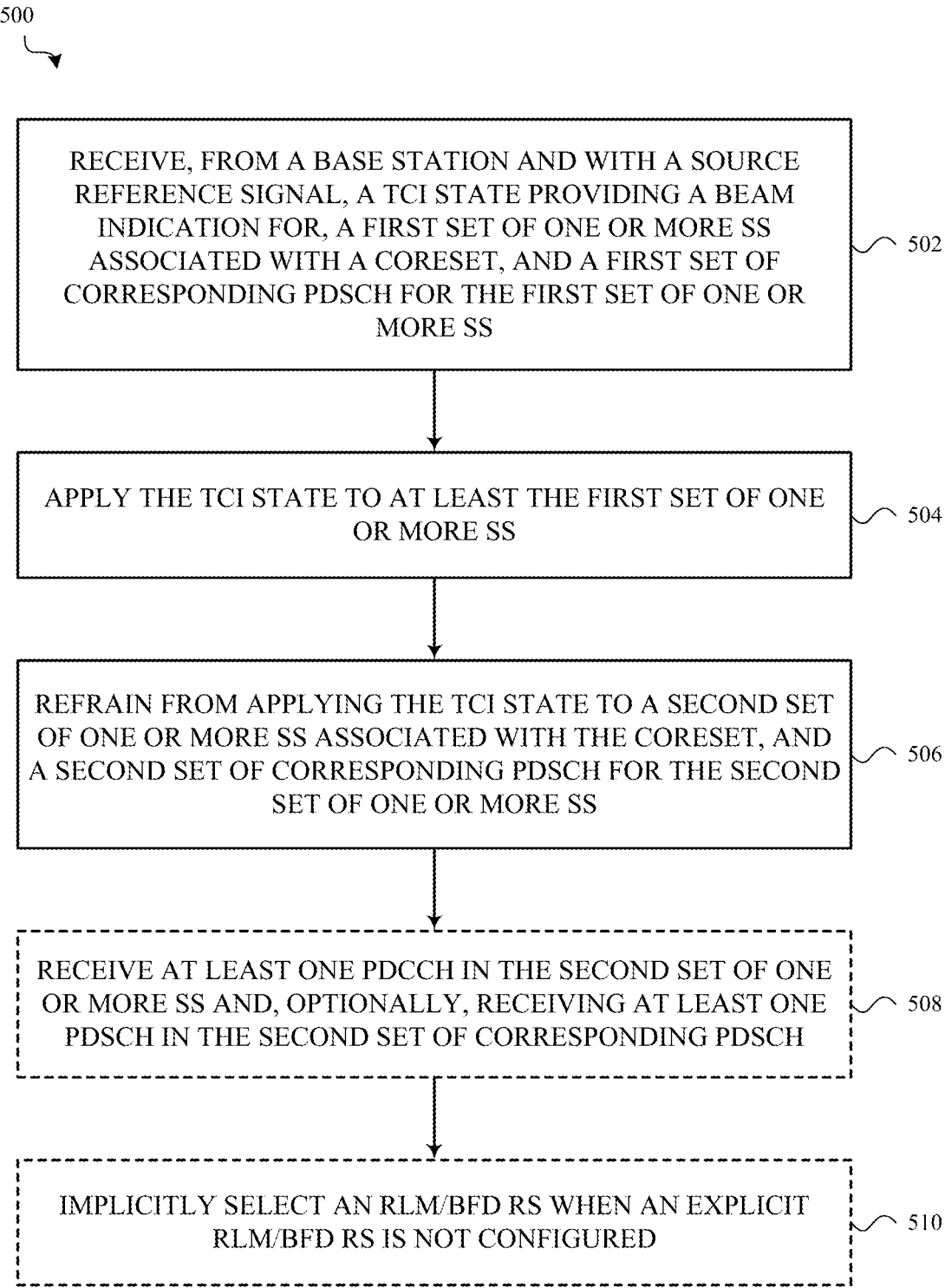

500

RECEIVE, FROM A BASE STATION AND WITH A SOURCE REFERENCE SIGNAL, A TCI STATE PROVIDING A BEAM INDICATION FOR, A FIRST SET OF ONE OR MORE SS ASSOCIATED WITH A CORESET, AND A FIRST SET OF CORRESPONDING PDSCH FOR THE FIRST SET OF ONE OR MORE SS          502

APPLY THE TCI STATE TO AT LEAST THE FIRST SET OF ONE OR MORE SS          504

REFRAIN FROM APPLYING THE TCI STATE TO A SECOND SET OF ONE OR MORE SS ASSOCIATED WITH THE CORESET, AND A SECOND SET OF CORRESPONDING PDSCH FOR THE SECOND SET OF ONE OR MORE SS          506

RECEIVE AT LEAST ONE PDCCH IN THE SECOND SET OF ONE OR MORE SS AND, OPTIONALLY, RECEIVING AT LEAST ONE PDSCH IN THE SECOND SET OF CORRESPONDING PDSCH          508

IMPLICITLY SELECT AN RLM/BFD RS WHEN AN EXPLICIT RLM/BFD RS IS NOT CONFIGURED          510

TRANSMIT TO A UE, WITH A SOURCE REFERENCE SIGNAL, A TCI STATE PROVIDING A FIRST BEAM INDICATION FOR, A FIRST SET OF ONE OR MORE SS ASSOCIATED WITH A CORESET, AND A FIRST SET OF PDSCH CORRESPONDING TO THE FIRST SET OF ONE OR MORE SS — 602

TRANSMIT TO THE UE AT LEAST ONE OF A SECOND BEAM INDICATION OR AN INDICATION OF AN SSB FOR, A SECOND SET OF ONE OR MORE SS ASSOCIATED WITH THE CORESET, AND A SECOND SET OF PDSCH CORRESPONDING TO THE SECOND SET OF ONE OR MORE SS — 604

*FIG. 6*

SYSTEMS AND METHODS FOR BEAM INDICATION FOR L1/L2 CENTRIC INTER-CELL MOBILITY

CROSS-REFERENCE TO RELATED APPLICATION

This application is a national phase application under 35 U.S.C. § 371 of PCT/CN2021/110418, filed Aug. 4, 2021, the contents of which are incorporated herein as if fully disclosed herein.

TECHNICAL FIELD

This application relates generally to wireless communication systems, including methods and implementations of beam indication for layer 1/layer 2 (L1/L2) centric inter-cell mobility.

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®)).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 3 shows an example method of a UE, which method may be used to optionally apply a transmission configuration indication (TCI) state to a set of one or more common search space (CSS) associated with a control channel resource set (CORESET) for which the TCI state is provided.

FIG. 5 shows an example method of a UE, which method may be used to optionally apply a TCI state to only some search space (SS) associated with a CORESET for which the TCI state is provided.

FIG. 6 shows an example method of a base station, which method may be used to optionally indicate a set of one or more some CSS to which a TCI state associated with a CORESET should be applied.

DETAILED DESCRIPTION

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with a network. Therefore, the UE as described herein is used to represent any appropriate electronic device.

In 3GPP Release 17 (Rel-17), a unified TCI framework is being introduced. In accord with such a unified TCI framework, a base station (e.g., a gNB) can indicate, to a UE, a TCI state that provides an antenna port quasi-co-location (QCL) indication (e.g., a beam indication) for dedicated physical downlink control channel (PDCCH)/physical downlink shared channel (PDSCH)/physical uplink shared channel (PUSCH)/physical uplink control channel (PUCCH) transmissions. To support L1/L2 centric inter-cell mobility, the source reference signal for the TCI state can be a reference signal (RS, e.g., a synchronization signal block (SSB) or channel state information reference signal (CSI-RS)) transmitted by a UE's serving cell or a neighbor cell.

Figure 1:
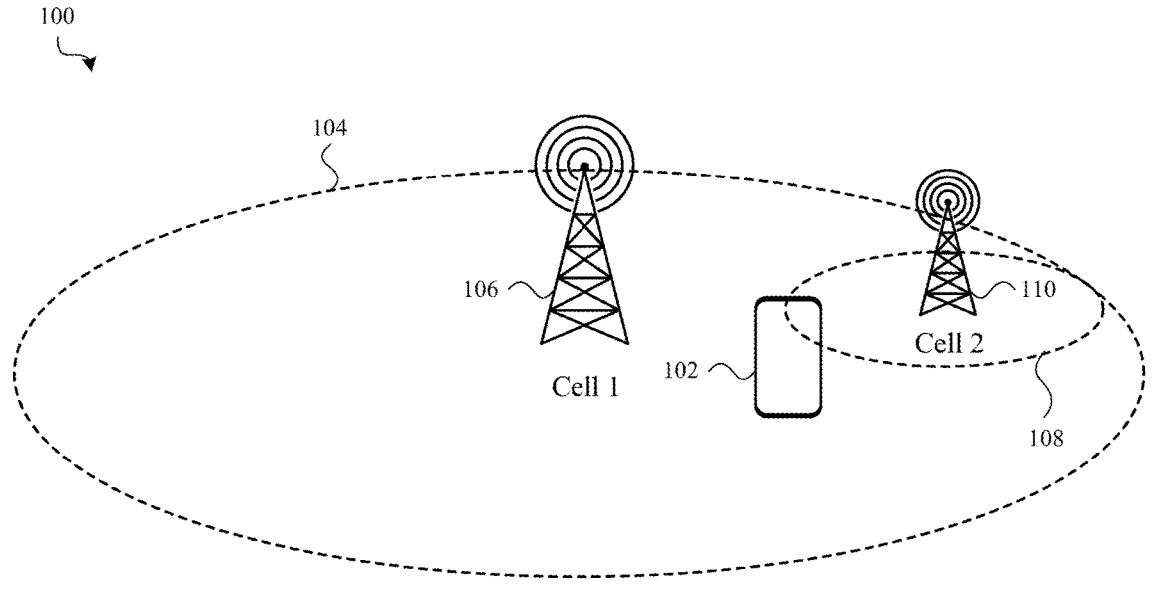
FIG. 1 shows a scenario (Scenario 1) in which a UE enters the coverage area for Cell 1, acquires Cell 1 as its serving cell, and then nears or enters the coverage area of a neighbor cell (i.e., Cell 2).
Figure 2:
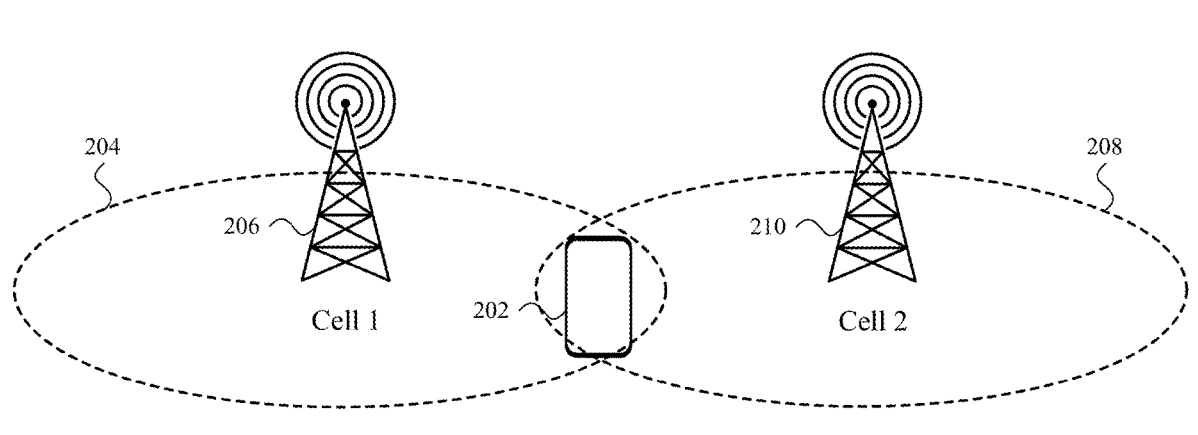
FIG. 2 shows a scenario (Scenario 2) in which a UE enters the coverage area for Cell 1, acquires Cell 1 as its serving cell, and then nears or enters the coverage area of a neighbor cell (i.e., Cell 2).

Two different scenarios for L1/L2 centric inter-cell mobility between a serving cell and a neighbor cell are shown in FIGS. 1 and 2. FIG. 1 shows a scenario 100 (Scenario 1) in which a UE 102 enters the coverage area 104 for Cell 1 (represented by a base station 106), acquires Cell 1 as its serving cell, and then nears or enters the coverage area 108 of a neighbor cell (e.g., Cell 2, represented by a base station 110). The coverage area 108 of Cell 2 may partially or wholly overlap the coverage area 104 of Cell 1, but as an example is shown to wholly overlap the coverage area 104 of Cell 1. Assuming that the UE 102 is still receiving an acceptable Quality of Service (QoS) from Cell 1 but can also receive an acceptable QoS from Cell 2, the UE 102 may maintain Cell 1 as its serving cell but also receive some transmissions (e.g., dedicated information transmissions) from Cell 2, similar to multiple transmission point (multi-TRP) operation.

FIG. 2 shows a scenario (Scenario 2) in which a UE 202 enters the coverage area 204 for Cell 1 (represented by a base station 206), acquires Cell 1 as its serving cell, and then nears or enters the coverage area 208 of a neighbor cell (e.g., Cell 2, represented by a base station 210). The coverage area 208 of Cell 2 may partially or wholly overlap the coverage area 204 of Cell 1, but as an example is shown to partially overlap the coverage area 204 of Cell 1. In Scenario 2, a handover from Cell 1 to Cell 2 may be initiated—possibly because the UE 202 can receive a better QoS from Cell 2 than Cell 1.

In each of Scenario 1 and Scenario 2, a UE may identify a PDCCH based on a configuration of a CORESET and a SS. SSs may include CSS and UE-specific search space (USS; i.e., a SS dedicated to a particular UE). Each SS may be linked with a CORESET, and different SSs may be linked with a same CORESET (i.e., a set of one or more SSs may be linked with a same CORESET). The TCI state being introduced in 3GPP Rel-17 is provided for a UE at the CORESET level, for dedicated PDCCH/PDSCH/PUCCH/PUSCH. There is no provision for how or whether a TCI state may be applied to CSS, which CSS may be received from Cell 1 or Cell 2 in Scenarios 1 and 2.

There are several types of SSs, as defined in s10.1 in 3GPP TS 38.213. Type0-PDCCH CSS set is configured by pdcch-ConfigSIB1 in a master information block (MIB), or by searchSpaceSIB1 in PDCCH-ConfigCommon, or by searchSpaceZero in PDCCH-ConfigCommon, for a downlink control information (DCI) format with cyclic redundancy check (CRC) scrambled by a system information Radio Network Temporary Identifier (SI-RNTI) on the primary cell of the Master Cell Group (MCG). Type0A-PDCCH CSS set is configured by searchSpaceOtherSystem-Information in PDCCH-ConfigCommon, for a DCI format with CRC scrambled by an SI-RNTI on the primary cell of the MCG. Type1-PDCCH CSS set is configured by ra-SearchSpace in PDCCH-ConfigCommon, for a DCI format with CRC scrambled by a random access RNTI (RA-RNTI), a MsgB-RNTI, or a temporary cell RNTI (TC-RNTI) on the primary cell of the MCG. Type2-PDCCH CSS set is configured by pagingSearchSpace in PDCCH-ConfigCommon, for a DCI format with CRC scrambled by a paging RNTI (P-RNTI) on the primary cell of the MCG. Type3-PDCCH CSS is configured by SearchSpace in PDCCH-Config with searchSpaceType=common, for DCI formats with CRC scrambled by an interruption RNTI (I-RNTI), slot format indication RNTI (SFI-RNTI), transmit power control PUSCH RNTI (TPC-PUSCH-RNTI), TPC-PUCCH-RNTI, TPC sounding reference symbols RNTI (TPC-SRS-RNTI), or cancellation indication RNTI (CI-RNTI) and, only for the primary cell of the MCG, a cell RNTI (C-RNTI), modulation coding scheme cell RNTI (MCS-C-RNTI), configured scheduling RNTI(s) (CS-RNTI(s)), or power saving RNTI (PS-RNTI). USS set is configured by SearchSpace in PDCCH-Config with searchSpaceType=ue-Specific, for DCI formats with CRC scrambled by a C-RNTI, MCS-C-RNTI, semi-persistent CSI RNTI (SP-CSI-RNTI), CS-RNTI(s), sidelink RNTI (SL-RNTI), sidelink configured scheduling RNTI (SL-CS-RNTI), or SL semi-persistent scheduling V2X RNTI (SL semi-persistent scheduling V-RNTI).

FIG. 3 shows an example method 300 of a UE, which method 300 may be used to optionally apply a TCI state to a set of one or more CSS associated with a CORESET for which the TCI state is provided.

At block 302, the method 300 may include identifying, for a CORESET, a set of one or more associated CSS and corresponding PDSCH to which a TCI state received from a base station (e.g., a gNB or other type of base station) should be applied.

At block 304, the method 300 may include receiving the TCI state with a source reference signal (e.g., an SSB or CSI-RS) transmitted by the base station. The operation(s) at block 304 may occur before or after the operation(s) at block 302.

At block 306, the method 300 may include applying the TCI to at least one of a dedicated PDCCH, PDSCH, PUCCH, and/or PUSCH for the UE (e.g., a dedicated PDSCH in a USS), and/or at least one CSS and corresponding PDSCH in the identified set of one or more CSS and corresponding PDSCH.

The remaining blocks of the method 300 are optional and will be described later in this description.

In some embodiments of the method 300, identifying the set of one or more associated CSS and corresponding PDSCH, to which the TCI state received from the base station should be applied, may include receiving, via radio resource control (RRC) signaling, an indication of at least one CSS, in the set of one or more associated CSS, to which the TCI state should be applied; and identifying the set of one or more associated CSS and corresponding PDSCH, to which the TCI state received from the base station should be applied, at least partly from the received indication. In some cases, the received indication may be configured per bandwidth part (BWP), per serving cell, per serving cell group, or per UE. In some cases, the received indication may be configured per TCI state. In some cases, an indication of at least one CSS may be an indication that a TCI state (or TCI states) should be applied to all CSS.

In some embodiments of the method 300, identifying the set of one or more associated CSS and corresponding PDSCH, to which the TCI state received from the base station should be applied, may include receiving, in a medium access control (MAC) control element (MAC CE), an indication of at least one CSS, in the set of one or more associated CSS, to which the TCI should be applied; and identifying the set of one or more associated CSS and corresponding PDSCH, to which the TCI state received from the base station should be applied, at least partly from the received indication. In some cases, the indication may apply to all TCI states identified in the MAC CE. That is, the indication may indicate at least one CSS to which all of the TCI states identified in the MAC CE should be applied. In some cases, the MAC CE should include an indication per TCI state. For example, a first indication may indicate a first at least one CSS to which a first TCI state identified in the MAC CE should be applied, and a second indication may indicate a second at least one CSS to which a second TCI state identified in the MAC CE should be applied. In some cases, an indication of at least one CSS may be an indication that a TCI state (or TCI states) should be applied to all CSS.

In some embodiments of the method 300, identifying the set of one or more associated CSS and corresponding PDSCH, to which the TCI state received from the base station should be applied, may include receiving, via DCI used for TCI indication (e.g., DCI format 0_1 or 0_2), an indication of at least one CSS, in the set of one or more associated CSS, to which the TCI state should be applied; and identifying the set of one or more associated CSS and corresponding PDSCH, to which the TCI state received from the base station should be applied, at least partly from the received indication. In some cases, the received indication may be received in a first field or a first bit that is separate from a second field or a second bit that indicates the TCI state.

In each of the above embodiments, the received indication can be a one-bit indicator that indicates whether a TCI state (or TCI states) should be applied to CSS generally (e.g., to all CSS), or to a predefined set of CSS. In these cases, identifying the set of one or more associated CSS and corresponding PDSCH, to which the TCI state received from the base station should be applied, may include analyzing the one-bit indicator. Alternatively, the received indication can be an N-bit indicator (e.g., a bitmap), where N is greater than one. In these cases, identifying the set of one or more associated CSS and corresponding PDSCH, to which the TCI state received from the base station should be applied, may include analyzing the N-bit indicator. Different bits or bit combinations may provide indications of whether a TCI state (or TCI states) should be applied to different CSS.

In some embodiments of the method 300, identifying the set of one or more associated CSS and corresponding PDSCH, to which the TCI state received from the base station should be applied, may include determining to apply the TCI state to at least one predetermined CSS. In some cases, the at least one predetermined CSS may include at least Type3-PDCCH CSS set, because this CSS is not broadcast and is therefore like a dedicated SS (or USS).

As described with reference to FIG. 3, a UE may identify a set of one or more CSS and associated PDSCH associated with a CORESET. In some cases, the set of one or more CSS may include all CSS associated with the CORESET. In some cases, the set of one or more CSS may only include some of the CSS associated with the CORESET, and there may be one or more other CSS associated with the CORESET. The TCI state may not apply to these other CSS. In these cases, the base station may associate an SSB with each of these CSS, and transmit downlink signals, repeatedly, in each monitoring occasion for the CSS. The UE may select one or more of the monitoring occasions for receiving the downlink signals, and may receive the downlink signals based on the SSB. In Scenario 1, the SSB and downlink signals may be transmitted from the UE's current serving cell (e.g., Cell 1 in FIG. 1). In Scenario 2, the SSB and downlink signals should be transmitted by the serving cell associated with the TCI state received at block 306. The association between SSB and CSS for both cells should be provided by higher layer signaling (e.g., RRC signaling). Alternatively, the association rule may be common for both cells (e.g., the time and frequency offset between a CSS instance and a SSB may be common for both cells, and the UE can identify the corresponding CSS based on the SSB pattern for each cell).

In the cases identified in the preceding paragraph, and at block 308, the method 300 of the UE may further and optionally include identifying a CSS to which no received TCI state applies. At block 310, the method 300 may include selecting a monitoring occasion to receive downlink signals for the CSS. At block 312, the method 300 may include monitoring the monitoring occasion for the downlink signals. At block 314, the method 300 may include receiving at least an SSB while monitoring the monitoring occasion for the downlink signals (and, in some cases, block 314 may include receiving the downlink signals, such as DCI, a PDCCH, and so on).

Whether the UE's serving cell should be changed after receiving the TCI state can be configured by higher layer signaling (e.g., RRC signaling, MAC CE signaling, or DCI). In one example, an indicator may be provided with TCI indication signaling to indicate whether the UE's serving cell should be changed.

The TCI state being introduced in 3GPP Rel-17 is a single TCI state. Described herein are embodiments in which two TCI states may be received by a UE. In Scenario 1, described with reference to FIG. 1, a UE may receive PDCCH and PDSCH from both a serving cell and a neighbor cell. However, some UEs may be limited to a single-beam communication capability (i.e., communication by one beam at a time) and may only support a single active TCI state. In these cases, the UE may time multiplex communications with Cell 1 and Cell 2 (e.g., in different time windows).

When a UE is limited to a single-beam communication capability, and in a first set of embodiments, the set of one or more associated CSS and corresponding PDSCH to which the TCI state received at block 304 should be applied includes Type1-PDCCH CSS set, Type2-PDCCH CSS set, and Type3-PDCCH CSS set. The TCI state may also be applied to USS and corresponding PDSCH. In these embodiments, the method 300 may further include refraining from decoding a System Information Block (SIB) after an RRC connection, unless indicated to do so by the base station. When the UE receives the indication to decode the SIB from the base station, the method may further include refraining from decoding other signals within a time window. A duration of the time window may be reported by UE capability or, alternatively, configured by higher layer signaling (e.g., by RRC signaling or a MAC CE).

When a UE is limited to a single-beam communication capability, and in a second set of embodiments, the set of one or more associated CSS and corresponding PDSCH to which the TCI state received at block 304 should be applied includes only Type2-PDCCH CSS set and Type3-PDCCH CSS set. The TCI state may also be applied to USS and corresponding PDSCH. In these embodiments, the method 300 may further include sending a physical random access channel (PRACH) for random access (e.g., for contention based random access (CBRA) and/or contention free random access (CFRA)) and, after sending the PRACH, resetting a beam applied to all channels, across all component carriers (CCs) in a band or a band group, based on an SSB associated with the PRACH.

When a UE is limited to a single-beam communication capability, and in a third set of embodiments, the set of one or more associated CSS and corresponding PDSCH to which the TCI state received at block 304 should be applied includes only Type1-PDCCH CSS set and Type3-PDCCH CSS set. The TCI state may also be applied to USS and corresponding PDSCH. In these embodiments, the method 300 may further include selecting a monitoring occasion to decode paging information for paging reception, and dropping signals that are transmitted with PDCCH/PDSCH for paging within a time window.

When a UE is limited to a single-beam communication capability, and in a fourth set of embodiments, the set of one or more associated CSS and corresponding PDSCH to which the TCI state received at block 304 should be applied includes only Type3-PDCCH CSS set. The TCI state may also be applied to USS and corresponding PDSCH.

When a UE is limited to a single-beam communication capability, and in a fifth set of embodiments, the set of one or more associated CSS and corresponding PDSCH to which the TCI state received at block 304 should be applied may be associated with a CORSET other than a CORESET #0 or a commonControlResourceSet. Furthermore, and in some embodiments, the CORESET #0 or the commonControlResourceSet may only be associated with some SSs, such as Type0-PDCCH set, Type0A-PDCCH set, Type1-PDCCH set, and Type2-PDCCH set. Alternatively, the CORESET #0 or the commonControlResourceSet may be associated with all CSS. The CORESET #0 and commonControlResourceSet may be received in some sets of time windows, and SS associated with other CORESETs may be received in other sets of time windows. In some cases, the different sets of time windows may be associated with receiving signals from different cells.

Figure 4:
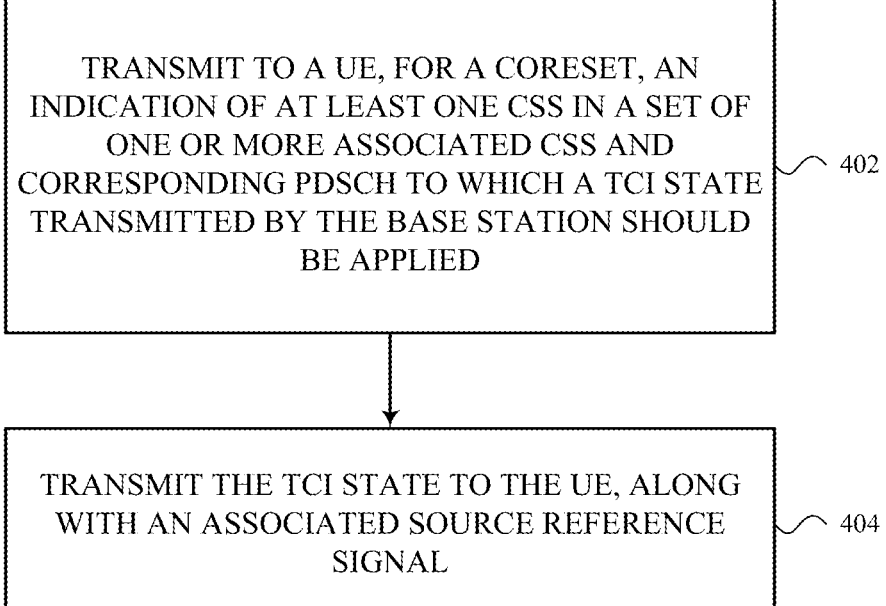
FIG. 4 shows an example method of a base station, which method may be used to optionally indicate at least one CSS and corresponding physical downlink shared channel (PDSCH) to which a TCI state transmitted by the base station should be applied.

FIG. 4 shows an example method 400 of a base station (e.g., a gNB or other type of base station), which method 400 may be used to optionally indicate at least one CSS and corresponding PDSCH to which a TCI state transmitted by the base station should be applied.

At block 402, the method 400 may include transmitting to a UE, for a CORESET, an indication of at least one CSS in a set of one or more associated CSS and corresponding PDSCH to which a TCI state transmitted by the base station should be applied. The indication may include any of the indications described with reference to FIG. 2.

At block 404, the method 400 may include transmitting the TCI state to the UE along with an associated source reference signal. The operation(s) at block 404 may occur before or after the operation(s) at block 402.

In some embodiments of the method 400, the indication of the at least one CSS in the set of one or more associated CSS and corresponding PDSCH may be transmitted via RRC signaling. In some cases, the indication may be configured per BWP, per serving cell, per serving cell group, or per UE. In some cases, the indication may be configured per TCI state.

In some embodiments of the method 400, the indication of the at least one CSS in the set of one or more associated CSS and corresponding PDSCH may be transmitted in a MAC CE. In some cases, the indication may apply to all TCI states identified in the MAC CE. In some cases, the indication may only apply to the TCI state transmitted at block 404.

In some embodiments of the method 400, the indication of the at least one CSS in the set of one or more associated CSS and corresponding PDSCH may be transmitted in DCI used for TCI indication. In some cases, the indication may be transmitted in a first field or a first bit that is separate from a second field or a second bit that indicates the TCI state.

In some embodiments of the method 400, the UE to which the indication and TCI state are transmitted, at blocks 402 and 404 respectively, may be limited to a single-beam communication capability. In these embodiments, the base station may adjust the indication of the at least one CSS in the set of one or more associated CSS and corresponding PDSCH based on the determination that the UE is limited to the single-beam communication capability. In some cases, the indication may be adjusted in one of the ways described with reference to FIG. 2.

As discussed above, a CORESET may in some cases be associated with both CSS and USS. The TCI state being introduced in 3GPP Rel-17 is provided for a UE at the CORESET level, for dedicated PDCCH/PDSCH/PUCCH/ PUSCH. There is no provision for how or whether a TCI state may be applied to CSS, and no provision for how to receive different SSs on different beams (e.g., from different cells).

FIG. 5 shows an example method 500 of a UE, which method 500 may be used to optionally apply a TCI state to only some SS associated with a CORESET for which the TCI state is provided.

At block 502, the method 500 may include receiving, from a base station (e.g., a gNB or other type of base station) and with a source reference signal, a TCI state providing a beam indication for a first set of one or more SS associated with a CORESET and a first set of corresponding PDSCH for the first set of one or more SS.

At block 504, the method 500 may include applying the TCI state to at least the first set of one or more SS. The TCI state may also be applied to the first set of corresponding PDSCH.

At block 506, the method 500 may include refraining from applying the TCI state to a second set of one or more SS associated with the CORESET and a second set of corresponding PDSCH for the second set of one or more SS. In some cases, the method 500 may include refraining from applying the TCI state to all other SS associated with the CORESET (i.e., all SS not included in the first set of one or more SS).

Optionally, and at block 508, the method 500 may include receiving at least one PDCCH in the second set of one or more SS and, optionally, receiving at least one PDSCH in the second set of corresponding PDSCH.

Optionally, and at block 510, the method 500 may include implicitly selecting a radio link monitoring (RLM) and beam faliure detection (BFD) reference signal (RS) (i.e., an RLM/ BFD RS) when an explicit RLM/BFD RS is not configured.

In some embodiments, the TCI state received at block 502 may be a first TCI state and the beam indication provided by the first TCI state may be a first beam indication. In these embodiments, the method 500 may include receiving a second TCI state at block 508. The second TCI state may provide a second beam indication for the second set of one or more SS and the second set of corresponding PDSCH. The second TCI state may be applied to at least the second set of one or more SS by the UE. The second TCI state may also be applied to the second set of corresponding PDSCH. In some cases, the first set of one or more SS may include only USS. Alternatively, the first set of one or more SS may include USS and at least Type3-PDCCH CSS set. In some cases, the first and second TCI states may be received with the same source reference signal. Alternatively, the source reference signal received at block 502 may be a first source reference signal, and the second TCI state may be received with a second source reference signal. The second source reference signal may be a first SSB received from the base station, or a second SSB quasi-co-located (QCLed) with the first SSB. The first TCI state and the second TCI state may be received in a same L1/L2 signaling or different L1/L2 signaling.

As proposed in 3GPP Rel-17, an RLM/BFD RS is selected based on the one configured in a TCI state for a CORESET when an RLM/BFD RS is not explicitly configured. See, e.g., s5 and s6 of 3GPP TSS 38.213. When two TCI states are provided to a UE and an RLM/BFD RS is not explicitly configured, a framework for implicitly selecting an RLM/BFD RS is needed. A number of methods for selecting an RLM/BFD RS, at block 510 of the method 500, are therefore described below.

A first possible method for selecting an RLM/BFD RS, at block 510, may include determining an explicit RS is not configured for RLM and BFD RS selection. An RLM/BFD RS may then be implicitly selected, by the UE, based on whether the first TCI state or the second TCI state is applied to at least USS (i.e., a reference signal associated with a TCI state that is applied to at least USS may be selected). RLM/BFD may be performed using the selected RLM/BFD RS.

A second possible method for selecting an RLM/BFD RS, at block 510, may include determining an explicit RS is not configured for RLM and BFD RS selection. An RLM/BFD RS may then be implicitly selected, by the UE, based on whether the first TCI state or the second TCI state is applied only to CSS (i.e., a reference signal associated with a TCI state that is only applied to CSS may be selected).

A third possible method for selecting an RLM/BFD RS, at block 510, may include determining an explicit RS is not configured for RLM and BFD RS selection. A first RLM/BFD RS may then be implicitly selected, by the UE, based on the first TCI state, and a second RLM/BFD RS may be selected based on the second TCI state (i.e., different reference signals associated with different TCI states may be selected).

A fourth possible method for selecting an RLM/BFD RS, at block 510, may include receiving, at the UE and in RRC signaling or in a MAC CE, an indication of whether to select an RLM/BFD RS based on the first TCI state or based on the second TCI state.

A fifth possible method for selecting an RLM/BFD RS, at block 510, may include determining an explicit RS is not configured for RLM and BFD RS selection. An RLM/BFD RS may then be implicitly selected, by the UE, based on an at least one of a first ID of the first TCI state or a second ID of the second TCI state. For example, the UE may be determined by comparing TCI identifiers (IDs) associated with each of the first TCI state and second TCI state, and selecting an RLM/BFD RS based on the comparison (e.g., a reference signal associated with the TCI state having the lower TCI ID may be selected).

A sixth possible method for selecting an RLM/BFD RS, at block 510, may include determining an explicit RS is not configured for RLM and BFD RS selection. An RLM/BFD RS may then be selected by the UE and reported to the base station.

A seventh possible method for selecting an RLM/BFD RS, at block 510, may include determining an explicit RS is not configured for RLM and BFD RS selection. An RLM/BFD RS associated with a serving cell of the UE may then be selected by the UE. In accord with the seventh possible method for selecting an RLM/BFD RS, if a neighbor cell of the UE is also associated with the serving cell of the UE, one of the first through sixth methods, or another method, may be used to select the RLM/BFD RS.

After the UE performs a beam failure recovery (BFR) procedure (e.g., 28 symbols after the UE receives a BFR response), the UE can update the beam applied to one or more SSs based on the newly identified beam which is reported in the BFR request. The one or more SSs to which the updated beam is applied may correspond to: the SSs in the first set of one or more SS, to which the first TCI was applied; the SSs in the second set of one or more SS, to which the second TCI was applied; or the SSs in both the first and second sets of one or more SS. The one or more SSs to which the updated beam is applied may be predefined (e.g., programmed into the UE) or configured by higher layer signaling (e.g., in RRC signaling, in a MAC CE, or indicated in a PDCCH (e.g., in the BFR response).

In some embodiments, the method 500 may include receiving, at block 508, an indication of an SSB associated with the first set of one or more SS and the second set of one or more SS. The indicated SSB should be an SSB associated with a serving cell for the UE. The UE may monitor a monitoring occasion associated with the indicated SSB, and may receive a PDCCH in the second set of one or more SS in response to the monitoring. In some cases, the UE may only need to monitor the monitoring occasion associated with the indicated SSB to receive a PDCCH in the second set of one or more SS. In some cases, the indication of the SSB associated with the second set of one or more SS may be received in a MAC CE. In some cases, the indication of the SSB associated with the second set of one or more SS may be received in DCI. In some of these embodiments, the first set of one or more SS may include only USS. Alternatively, the first set of one or more SS may include USS and at least Type3-PDCCH CSS set. When an indication of the SSB associated with the second set of one or more SS is received, and when an RLM/BFD RS is not explicitly configured, an RLM/BFD RS may be implicitly selected by the UE using any of the previously described methods (where the indicated SSB is used as the reference signal associated with the second TCI state).

In some embodiments, the method 500 may include selecting, at block 508, any monitoring occasion in which to receive a PDCCH in the second set of one or more SS. The UE may then monitor the selected monitoring occasion for the PDCCH. The base station may transmit the PDCCH repeatedly in the monitoring occasion. In these embodiments, and when an RLM/BFD RS is not explicitly configured, an RLM/BFD RS may be implicitly selected by the UE based on the TCI state indicated at block 502. After the UE performs a BFR procedure, the UE can update the beam applied to the first set of one or more SS based on the newly identified beam which is reported in the BFR request.

As an alternative to the method 500, a CORESET may only be associated with types of SS that share a single TCI state. In some embodiments, the types of SS that share a single TCI state may be: only USS; or USS and at least Type3-PDCCH CSS set; or CSS only; or Type0-PDCCH CSS set, Type0A-PDCCH set, Type1-PDCCH CSS set, and Type2-PDCCH CSS set.

FIG. 6 shows an example method 600 of a base station (e.g., a gNB or other type of base station), which method 600 may be used to optionally indicate a set of one or more some CSS to which a TCI state associated with a CORESET should be applied.

At block 602, the method 600 may include transmitting to a UE, with a source reference signal, a TCI state providing a first beam indication for a first set of one or more SS associated with a CORESET and a first set of PDSCH corresponding to the first set of one or more SS.

At block 604, the method 600 may include transmitting to the UE at least one of a second beam indication or an indication of an SSB for a second set of one or more SS associated with the CORESET and a second set of PDSCH corresponding to the second set of one or more SS. In some embodiments, the second beam indication of the SSB may be transmitted as described with reference to FIG. 4.

In some embodiments of the method 600, the TCI state transmitted at block 602 may be a first TCI state, and transmitting the second beam indication at block 604 may include transmitting, to the UE, a second TCI state.

Figure 7:
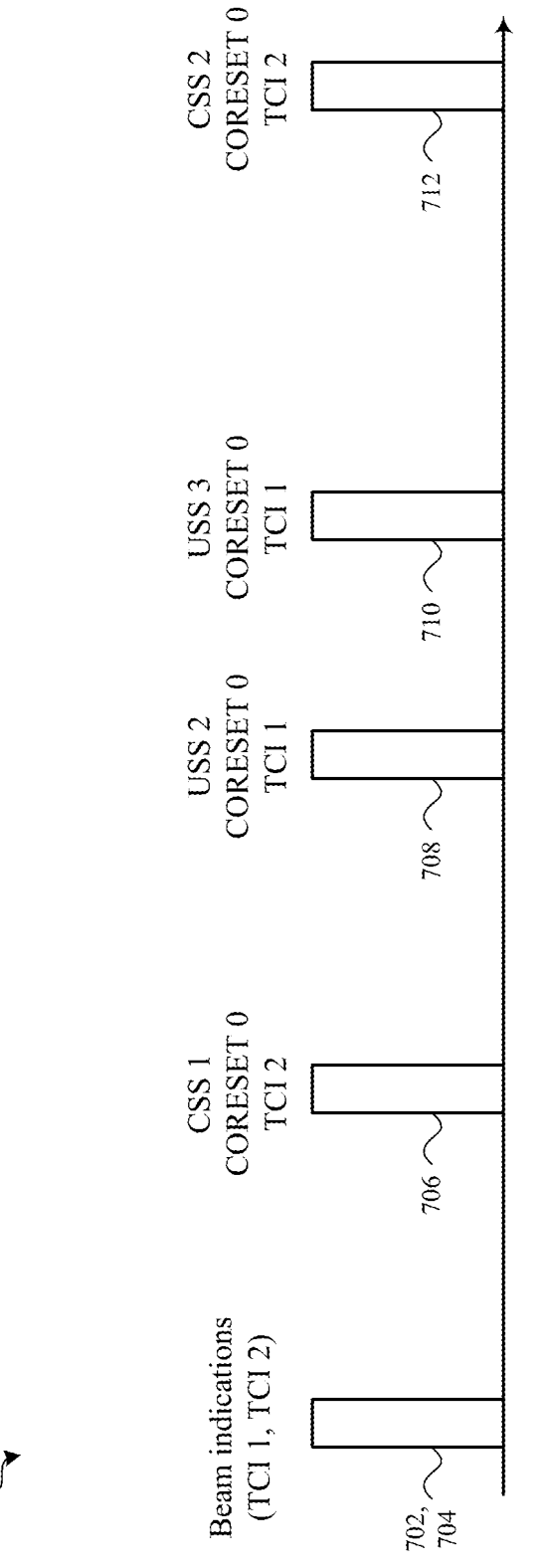
FIG. 7 shows an example timeline of beam indications for a CORESET 0 and SSs associated with the CORESET 0, as transmitted by a base station and received by a UE.

FIG. 7 shows an example timeline 700 of beam indications 702, 704 for a CORESET 0 and SSs 706, 708, 710, 712 associated with the CORESET 0, as transmitted (by a base station) and received (by a UE). By way of example, the beam indications 702, 704 (e.g., a first TCI state (TCI 1 702) and a second TCI state (TCI 2 704), or other indications) are shown to be transmitted in the same L1/L2 signaling. However, the beam indications 702, 704 may also be transmitted in different L1/L2 signaling and/or at different times. Subsequent to transmission/receipt of the beam indications 702, 704, a first SS 706 associated with the CORESET 0 (e.g., CSS 1 706) may be transmitted by the base station and received by the UE at a first time (and/or on a first set of time and frequency resources). As indicated in the beam indication signaling, the second beam indication 704 may be applied to the first SS 706 and used to receive the first SS 706. A second SS 708 associated with the CORESET 0 (e.g., USS 2 708) may be transmitted by the base station and received by the UE at a second time (and/or on a second set of time and frequency resources). As indicated in the beam indication signaling, the first beam indication 702 may be applied to the second SS 708 and used to receive the second SS 708. A third SS 710 associated with the CORESET 0 (e.g., USS 3 710) may be transmitted by the base station and received by the UE at a third time (and/or on a third set of time and frequency resources). As indicated in the beam indication signaling, the first beam indication 702 may be applied to the third SS 710 and used to receive the third SS 710. A fourth SS 712 associated with the CORESET 0 (e.g., CSS 2 712) may be transmitted by the base station and received by the UE at a fourth time (and/or on a fourth set of time and frequency resources). As indicated in the beam indication signaling, the second beam indication 704 may be applied to the fourth SS 712 and used to receive the fourth SS 712.

Embodiments contemplated herein include an apparatus having means to perform one or more elements of the method 300, 400, 500, or 600. In the context of method 300 or 500, this apparatus may be, for example, an apparatus of a UE (such as a wireless device 902 that is a UE, as described herein). In the context of method 400 or 600, this apparatus may be, for example, an apparatus of a base station (such as a network device 920 that is a base station, as described herein).

Embodiments contemplated herein include one or more non-transitory computer-readable media storing instructions to cause an electronic device, upon execution of the instructions by one or more processors of the electronic device, to perform one or more elements of the method 300, 400, 500, or 600. In the context of method 300 or 500, this non-transitory computer-readable media may be, for example, a memory of a UE (such as a memory 906 of a wireless device 902 that is a UE, as described herein). In the context of method 400 or 600, this non-transitory computer-readable media may be, for example, a memory of a base station (such as a memory 924 of a network device 920 that is a base station, as described herein).

Embodiments contemplated herein include an apparatus having logic, modules, or circuitry to perform one or more elements of the method 300, 400, 500, or 600. In the context of method 300 or 500, this apparatus may be, for example, an apparatus of a UE (such as a wireless device 902 that is a UE, as described herein). In the context of method 400 or

600, this apparatus may be, for example, an apparatus of a base station (such as a network device 920 that is a base station, as described herein).

Embodiments contemplated herein include an apparatus having one or more processors and one or more computer-readable media, using or storing instructions that, when executed by the one or more processors, cause the one or more processors to perform one or more elements of the method 300, 400, 500, or 600. In the context of method 300 or 500, this apparatus may be, for example, an apparatus of a UE (such as a wireless device 902 that is a UE, as described herein). In the context of the method 400 or 600, this apparatus may be, for example, an apparatus of a base station (such as a network device 920 that is a base station, as described herein).

Embodiments contemplated herein include a signal as described in or related to one or more elements of the method 300, 400, 500, or 600.

Embodiments contemplated herein include a computer program or computer program product having instructions, wherein execution of the program by a processor causes the processor to carry out one or more elements of the method 300, 400, 500, or 600. In the context of method 300 or 500, the processor may be a processor of a UE (such as a processor(s) 904 of a wireless device 902 that is a UE, as described herein), and the instructions may be, for example, located in the processor and/or on a memory of the UE (such as a memory 906 of a wireless device 902 that is a UE, as described herein). In the context of method 400 or 600, the processor may be a processor of a base station (such as a processor(s) 922 of a network device 920 that is a base station, as described herein), and the instructions may be, for example, located in the processor and/or on a memory of the base station (such as a memory 924 of a network device 920 that is a base station, as described herein).

Figure 8:
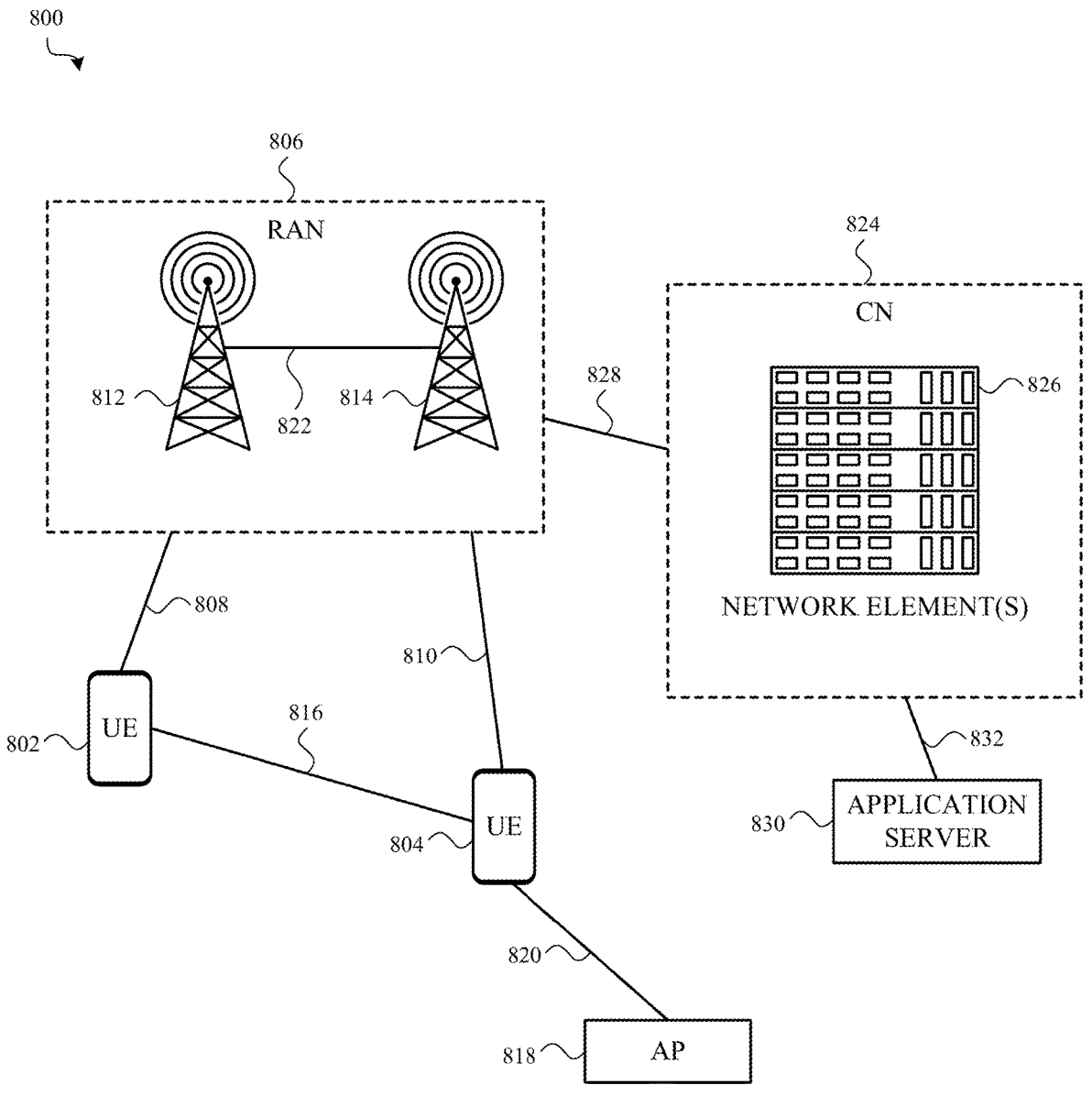
FIG. 8 illustrates an example architecture of a wireless communication system, according to embodiments disclosed herein.

FIG. 8 illustrates an example architecture of a wireless communication system 800, according to embodiments disclosed herein. The following description is provided for an example wireless communication system 800 that operates in conjunction with the LTE system standards and/or 5G or NR system standards as provided by 3GPP technical specifications.

As shown by FIG. 8, the wireless communication system 800 includes UE 802 and UE 804 (although any number of UEs may be used). In this example, the UE 802 and the UE 804 are illustrated as smartphones (e.g., handheld touch-screen mobile computing devices connectable to one or more cellular networks), but may also comprise any mobile or non-mobile computing device configured for wireless communication.

The UE 802 and UE 804 may be configured to communicatively couple with a RAN 806. In embodiments, the RAN 806 may be NG-RAN, E-UTRAN, etc. The UE 802 and UE 804 utilize connections (or channels) (shown as connection 808 and connection 810, respectively) with the RAN 806, each of which comprises a physical communications interface. The RAN 806 can include one or more base stations, such as base station 812 and base station 814, that enable the connection 808 and connection 810.

In this example, the connection 808 and connection 810 are air interfaces to enable such communicative coupling, and may be consistent with RAT(s) used by the RAN 806, such as, for example, an LTE and/or NR.

In some embodiments, the UE 802 and UE 804 may also directly exchange communication data via a sidelink interface 816. The UE 804 is shown to be configured to access an access point (shown as AP 818) via connection 820. By way of example, the connection 820 can comprise a local wireless connection, such as a connection consistent with any IEEE 802.11 protocol, wherein the AP 818 may comprise a Wi-Fi® router. In this example, the AP 818 may be connected to another network (for example, the Internet) without going through a CN 824.

In embodiments, the UE 802 and UE 804 can be configured to communicate using orthogonal frequency division multiplexing (OFDM) communication signals with each other or with the base station 812 and/or the base station 814 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 812 or base station 814 may be implemented as one or more software entities running on server computers as part of a virtual network. In addition, or in other embodiments, the base station 812 or base station 814 may be configured to communicate with one another via interface 822. In embodiments where the wireless communication system 800 is an LTE system (e.g., when the CN 824 is an EPC), the interface 822 may be an X2 interface. The X2 interface may be defined between two or more base stations (e.g., two or more eNBs and the like) that connect to an EPC, and/or between two eNBs connecting to the EPC. In embodiments where the wireless communication system 800 is an NR system (e.g., when CN 824 is a 5GC), the interface 822 may be an Xn interface. The Xn interface is defined between two or more base stations (e.g., two or more gNBs and the like) that connect to 5GC, between a base station 812 (e.g., a gNB) connecting to 5GC and an eNB, and/or between two eNBs connecting to 5GC (e.g., CN 824).

The RAN 806 is shown to be communicatively coupled to the CN 824. The CN 824 may comprise one or more network elements 826, which are configured to offer various data and telecommunications services to customers/subscribers (e.g., users of UE 802 and UE 804) who are connected to the CN 824 via the RAN 806. The components of the CN 824 may be implemented in one physical device or separate physical devices including components to read and execute instructions from a machine-readable or computer-readable medium (e.g., a non-transitory machine-readable storage medium).

In embodiments, the CN 824 may be an EPC, and the RAN 806 may be connected with the CN 824 via an S1 interface 828. In embodiments, the S1 interface 828 may be split into two parts, an S1 user plane (S1-U) interface, which carries traffic data between the base station 812 or base station 814 and a serving gateway (S-GW), and the S1-MME interface, which is a signaling interface between the base station 812 or base station 814 and mobility management entities (MMEs).

In embodiments, the CN 824 may be a 5GC, and the RAN 806 may be connected with the CN 824 via an NG interface 828. In embodiments, the NG interface 828 may be split into two parts, an NG user plane (NG-U) interface, which carries traffic data between the base station 812 or base station 814 and a user plane function (UPF), and the S1 control plane (NG-C) interface, which is a signaling interface between the base station 812 or base station 814 and access and mobility management functions (AMFs).

Generally, an application server 830 may be an element offering applications that use internet protocol (IP) bearer resources with the CN 824 (e.g., packet switched data services). The application server 830 can also be configured to support one or more communication services (e.g., VoIP sessions, group communication sessions, etc.) for the UE 802 and UE 804 via the CN 824. The application server 830 may communicate with the CN 824 through an IP communications interface 832.

Figure 9:
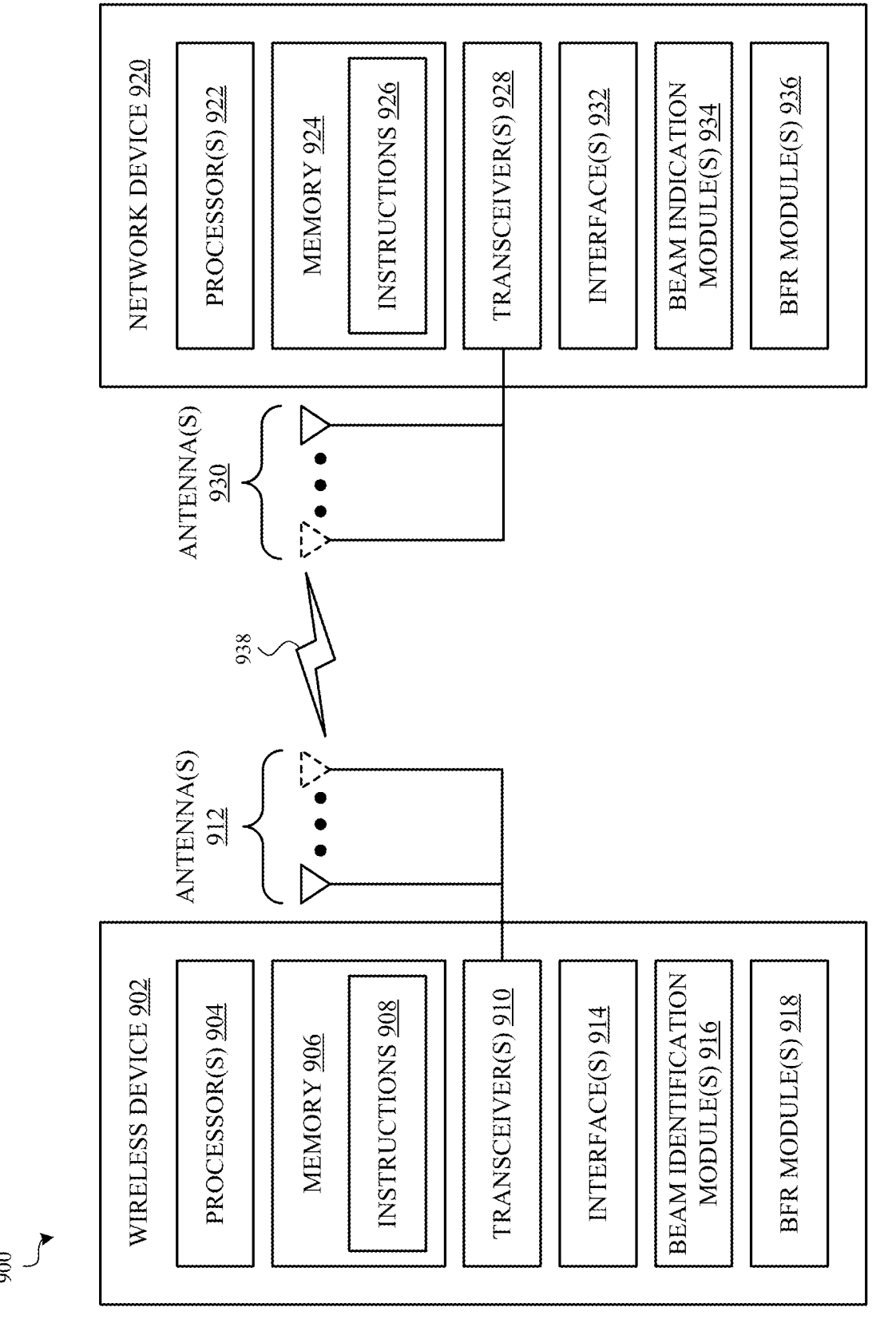
FIG. 9 illustrates a system for performing signaling between a wireless device and a network device, according to embodiments disclosed herein.

FIG. 9 illustrates a system 900 for performing signaling 938 between a wireless device 902 and a network device 920, according to embodiments disclosed herein. The system 900 may be a portion of a wireless communications system as herein described. The wireless device 902 may be, for example, a UE of a wireless communication system. The network device 920 may be, for example, a base station (e.g., an eNB or a gNB) of a wireless communication system.

The wireless device 902 may include one or more processor(s) 904. The processor(s) 904 may execute instructions such that various operations of the wireless device 902 are performed, as described herein. The processor(s) 904 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 902 may include a memory 906. The memory 906 may be a non-transitory computer-readable storage medium that stores instructions 908 (which may include, for example, the instructions being executed by the processor(s) 904). The instructions 908 may also be referred to as program code or a computer program. The memory 906 may also store data used by, and results computed by, the processor(s) 904.

The wireless device 902 may include one or more transceiver(s) 910 that may include radio frequency (RF) transmitter and/or receiver circuitry that use the antenna(s) 912 of the wireless device 902 to facilitate signaling (e.g., the signaling 938) to and/or from the wireless device 902 with other devices (e.g., the network device 920) according to corresponding RATs.

The wireless device 902 may include one or more antenna(s) 912 (e.g., one, two, four, or more). For embodiments with multiple antenna(s) 912, the wireless device 902 may leverage the spatial diversity of such multiple antenna(s) 912 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 902 may be accomplished according to precoding (or digital beamforming) that is applied at the wireless device 902 that multiplexes the data streams across the antenna(s) 912 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 902 may implement analog beamforming techniques, whereby phases of the signals sent by the antenna(s) 912 are relatively adjusted such that the (joint) transmission of the antenna(s) 912 can be directed (this is sometimes referred to as beam steering).

The wireless device 902 may include one or more interface(s) 914. The interface(s) 914 may be used to provide input to or output from the wireless device 902. For example, a wireless device 902 that is a UE may include interface(s) 914 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 910/antenna(s) 912 already described) that allow for communication between the UE and other devices and may operate according to known protocols (e.g., Wi-Fi®, Bluetooth®, and the like).

The wireless device 902 may include a beam identification module 916 and/or BFR module 918. The beam identification module 916 and BFR module 918 may be implemented via hardware, software, or combinations thereof. For example, the beam identification module 916 and BFR module 918 may be implemented as a processor, circuit, and/or instructions 908 stored in the memory 906 and executed by the processor(s) 904. In some examples, the beam identification module 916 and BFR module 918 may be integrated within the processor(s) 904 and/or the transceiver(s) 910. For example, the beam identification module 916 and BFR module 918 may be implemented by a combination of software components (e.g., executed by a DSP or a general processor) and hardware components (e.g., logic gates and circuitry) within the processor(s) 904 or the transceiver(s) 910.

The beam identification module 916 may be used for various aspects of the present disclosure, for example, aspects of FIG. 1 through FIG. 7. The beam identification module 916 may be configured to, for example, receive, determine, and/or apply beam indications received from another device (e.g., the network device 920).

The BFR module 918 may be used for various aspects of the present disclosure, for example, aspects of FIG. 1 through FIG. 7. The BFR module 918 may be configured to, for example, implicitly select an RLM/BFD RS for BFR, or perform BFD as described herein.

The network device 920 may include one or more processor(s) 922. The processor(s) 922 may execute instructions such that various operations of the network device 920 are performed, as described herein. The processor(s) 904 may include one or more baseband processors implemented using, for example, a CPU, a DSP, an ASIC, a controller, an FPGA device, another hardware device, a firmware device, or any combination thereof configured to perform the operations described herein.

The network device 920 may include a memory 924. The memory 924 may be a non-transitory computer-readable storage medium that stores instructions 926 (which may include, for example, the instructions being executed by the processor(s) 922). The instructions 926 may also be referred to as program code or a computer program. The memory 924 may also store data used by, and results computed by, the processor(s) 922.

The network device 920 may include one or more transceiver(s) 928 that may include RF transmitter and/or receiver circuitry that use the antenna(s) 930 of the network device 920 to facilitate signaling (e.g., the signaling 938) to and/or from the network device 920 with other devices (e.g., the wireless device 902) according to corresponding RATs.

The network device 920 may include one or more antenna(s) 930 (e.g., one, two, four, or more). In embodiments having multiple antenna(s) 930, the network device 920 may perform MIMO, digital beamforming, analog beamforming, beam steering, etc., as has been described.

The network device 920 may include one or more interface(s) 932. The interface(s) 932 may be used to provide input to or output from the network device 920. For example, a network device 920 that is a base station may include interface(s) 932 made up of transmitters, receivers, and other circuitry (e.g., other than the transceiver(s) 928/antenna(s) 930 already described) that enables the base station to communicate with other equipment in a core network, and/or that enables the base station to communicate with external networks, computers, databases, and the like for purposes of operations, administration, and maintenance of the base station or other equipment operably connected thereto.

The network device 920 may include a beam indication module 934 and/or BFR module 936. The beam indication module 934 and BFR module 936 may be implemented via hardware, software, or combinations thereof. For example, the beam indication module 934 and BFR module 936 may be implemented as a processor, circuit, and/or instructions 926 stored in the memory 924 and executed by the processor(s) 922. In some examples, the beam indication module 934 and BFR module 936 may be integrated within the processor(s) 922 and/or the transceiver(s) 928. For example, the beam indication module 934 and BFR module 936 may be implemented by a combination of software components (e.g., executed by a DSP or a general processor) and hardware components (e.g., logic gates and circuitry) within the processor(s) 922 or the transceiver(s) 928.

The beam indication module 934 may be used for various aspects of the present disclosure, for example, aspects of FIG. 1 through FIG. 7. The beam indication module 934 may be configured to, for example, transmit beam indications to another device (e.g., the wireless device 902).

The BFR module 936 may be used for various aspects of the present disclosure, for example, aspects of FIG. 1 through FIG. 7. The BFR module 936 may be configured to for example, configure another device (e.g., the wireless device 902) to use BFD as described herein, or receive a BFR on an RLM/BFD RS.

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method, comprising:
receiving, via radio resource control (RRC) signaling, an indication of at least one common search space (CSS), in a set of one or more CSS associated with a control channel resource set (CORESET), to which a transmission configuration indication (TCI) state received from a network device should be applied;
identifying, at least partly from the indication of the at least one CSS and for a control channel resource set (CORESET), a set of one or more associated CSS and corresponding physical downlink shared channel (PDSCH) to which the TCI state received from the network device should be applied;
receiving the TCI state; and
applying the TCI state to,
at least one dedicated PDSCH; and
at least one CSS and corresponding PDSCH in the identified set of one or more CSS and corresponding PDSCH.

2. The method of claim 1, wherein identifying the set of one or more associated CSS and corresponding PDSCH, to which the TCI state received from the network device should be applied, comprises:

receiving in a medium access control (MAC) control element (MAC CE), an indication of the at least one CSS, in the set of one or more associated CSS, to which the TCI state should be applied; and
identifying the set of one or more associated CSS and corresponding PDSCH, to which the TCI state received from the network device should be applied, at least partly from the received indication.

3. The method of claim 1, wherein identifying the set of one or more associated CSS and corresponding PDSCH, to which the TCI state received from the network device should be applied, comprises:
receiving, in downlink control information (DCI) used for TCI indication, an indication of the at least one CSS, in the set of one or more associated CSS, to which the TCI state should be applied; and
identifying the set of one or more associated CSS and corresponding PDSCH, to which the TCI state received from the network device should be applied, at least partly from the received indication.

4. The method of claim 1, wherein identifying the set of one or more associated CSS and corresponding PDSCH, to which the TCI state received from the network device should be applied, comprises:
analyzing a one-bit indicator received from the network device.

5. The method of claim 1, wherein identifying the set of one or more associated CSS and corresponding PDSCH, to which the TCI state received from the network device should be applied, comprises:
analyzing an N-bit indicator received from the network device; wherein,
N is greater than one; and
different bits or bit combinations provide indications of whether the TCI state should be applied to different CSS in the set of one or more associated CSS.

6. The method of claim 1, wherein identifying the set of one or more associated CSS and corresponding PDSCH, to which the TCI state received from the network device should be applied, comprises:
determining to apply the TCI state to at least one predetermined CSS.

7. The method of claim 1, further comprising:
identifying a CSS to which no received TCI state applies;
selecting a monitoring occasion to receive downlink signals for the CSS;
receiving a synchronization signal block (SSB) associated with the CSS; and
monitoring the monitoring occasion for the downlink signals.

8. The method of claim 1, wherein:
the method is applied to a user equipment (UE) limited to a single-beam communication capability;
the TCI state is applied to UE-specific search space (USS) and corresponding PDSCH;
the set of one or more associated CSS and corresponding PDSCH to which the TCI state should be applied includes only Type1-PDCCH CSS set, Type2-PDCCH CSS set, and Type3-PDCCH CSS set; and
the method further comprises:
refraining from decoding a system information block (SIB) after a radio resource control (RRC) connection, unless indicated to do so by the network device.

9. The method of claim 1, wherein:
the method is applied to a user equipment (UE) limited to a single-beam communication capability;

the TCI state is applied to UE-specific search space (USS) and corresponding PDSCH;

the set of one or more associated CSS and corresponding PDSCH to which the TCI state should be applied includes only Type2-PDCCH CSS set and Type3-PDCCH CSS set; and the method further comprises:

sending a physical random access channel (PRACH) for random access; and resetting a beam applied to all channels, across all component carriers (CCs) in a band or a band group, based on a synchronization signal block (SSB) associated with the PRACH.

10. The method of claim 1, wherein:

the method is applied to a user equipment (UE) limited to a single-beam communication capability;

the TCI state is applied to UE-specific search space (USS) and corresponding PDSCH;

the set of one or more associated CSS and corresponding PDSCH to which the TCI state should be applied includes only Type1-PDCCH CSS set and Type3-PDCCH CSS set; and the method further comprises:

selecting a monitoring occasion to decode paging information for paging reception; and dropping signals that are transmitted with PDCCH/PDSCH for paging within a time window.

11. The method of claim 1, wherein:

the method is applied to a user equipment (UE) limited to a single-beam communication capability;

the TCI state is applied to UE-specific search space (USS) and corresponding PDSCH; and the set of one or more associated CSS and corresponding PDSCH to which the TCI state should be applied includes only Type3-PDCCH CSS set.

12. The method of claim 1, wherein:

the method is applied to a user equipment (UE) limited to a single-beam communication capability; and the CORESET for which the TCI state is received is not a CORESET #0 or a commonControlResourceSet.

13. A method of a network device, comprising:

transmitting to a user equipment (UE), via radio resource control (RRC) signaling, an indication of at least one common search space (CSS), in a set of one or more CSS associated with a control channel resource set (CORESET), to which a transmission configuration indication (TCI) state transmitted by the network device should be applied; and transmitting the TCI state to the UE.

14. The method of claim 13, wherein the indication of the at least one CSS in the set of one or more associated CSS is transmitted in a first field or a first bit that is separate from a second field or a second bit that indicates the TCI state.

15. A method, comprising:

for a user equipment (UE) limited to a single-beam communication capability with a wireless communications network;

identifying, for a control channel resource set (CORESET), a set of one or more associated common search space (CSS) and corresponding physical downlink shared channel (PDSCH) to which a transmission configuration indication (TCI) state received from a network device should be applied, the set of one or more associated CSS and corresponding PDSCH including only Type3-PDCCH CSS set;

receiving the TCI state; and applying the TCI state to, a UE-specific search space (USS) and corresponding PDSCH; and at least one CSS and corresponding PDSCH in the identified set of one or more CSS and corresponding PDSCH.

\* \* \* \* \*